United States Patent
Veygman

(10) Patent No.: US 9,342,159 B2
(45) Date of Patent: May 17, 2016

(54) METHOD AND APPARATUS FOR ACTIVATING ELECTRONIC DEVICES WITH GESTURES

(71) Applicant: Maxim Integrated Products, Inc., San Jose, CA (US)

(72) Inventor: Ilya K. Veygman, Palo Alto, CA (US)

(73) Assignee: Maxim Integrated Products, Inc., San Jose, CA (US)

( * ) Notice: Subject to any disclaimer, the term of this patent is extended or adjusted under 35 U.S.C. 154(b) by 0 days.

(21) Appl. No.: 14/371,164

(22) PCT Filed: Jan. 10, 2013

(86) PCT No.: PCT/US2013/021083
§ 371 (c)(1),
(2) Date: Jul. 10, 2014

(87) PCT Pub. No.: WO2013/106606
PCT Pub. Date: Jul. 18, 2013

(65) Prior Publication Data
US 2015/0009144 A1  Jan. 8, 2015

Related U.S. Application Data

(60) Provisional application No. 61/585,235, filed on Jan. 10, 2012.

(51) Int. Cl.
*G06F 3/03* (2006.01)
*G06F 1/32* (2006.01)
*G06F 3/01* (2006.01)

(52) U.S. Cl.
CPC ............ *G06F 3/0304* (2013.01); *G06F 1/3206* (2013.01); *G06F 3/017* (2013.01); *G06F 2203/04101* (2013.01)

(58) Field of Classification Search
CPC ...... G06F 3/017; G06F 3/0304; G06F 3/0484; G06F 15/5004; G06F 3/011; G06F 3/04883; G06F 3/0416
USPC .......................................................... 345/158
See application file for complete search history.

(56) References Cited

U.S. PATENT DOCUMENTS

| | | | | |
|---|---|---|---|---|
| 7,843,425 | B2* | 11/2010 | Lu | G06F 3/011 341/20 |
| 2007/0236468 | A1* | 10/2007 | Tuli | G06F 3/04883 345/173 |
| 2009/0195497 | A1* | 8/2009 | Fitzgerald | G06F 1/3203 345/156 |
| 2010/0009650 | A1* | 1/2010 | Orr | G06F 1/3203 455/343.1 |
| 2011/0050639 | A1* | 3/2011 | Challener | G06F 3/0416 345/175 |
| 2011/0251905 | A1* | 10/2011 | Lawrence | G03H 1/0005 705/15 |
| 2013/0010335 | A1* | 1/2013 | Baba | G03G 15/5004 358/3.01 |
| 2014/0118246 | A1* | 5/2014 | Park | G06F 3/0304 345/156 |

\* cited by examiner

*Primary Examiner* — Fred Tzeng
(74) *Attorney, Agent, or Firm* — TIPS Group

(57) ABSTRACT

An electronic device with gesture activation includes a body having at least one infrared (IR) transmissive window, an IR gesture detection sensor aligned with the transmissive window, a processor coupled to the gesture detection sensor and digital memory coupled to the processor. The digital memory includes code segments executable on the processor for starting a timer if a first gesture of an activation gesture sequence including an ordered plurality of gestures is received while at least one process of the electronic device is in an inactive mode, and for activating the at least one process of the electronic device if the remainder of ordered plurality of gestures is received before the timer has elapsed.

15 Claims, 5 Drawing Sheets

```
/**
    Precondition:  First gesture in sequence has been
received
    Postcondition:  Device is either unlocked or left
locked
 */
def
detect_unlock(key_sequence,received_gesture,window_length):
    k := 1;
    t0 := current_time();
    do until (current_time() > t0 + window_length) or
(unlock sequence complete):
        gesture := get_a_gesture();
        if ( gesture != key_sequence[k] ):
            do not unlock device;
            return_fail;
        else:
            k := k+1;
    if (all gestures received):
        unlock device;
        return_success;
    else:
        do not unlock device;
        return_fail;
```

FIG. 7

METHOD AND APPARATUS FOR ACTIVATING ELECTRONIC DEVICES WITH GESTURES

CROSS REFERENCE TO RELATED APPLICATIONS

This application is the US National Stage of International Application No. PCT/US2013/21083, filed Jan. 10, 2013, designating the United States, which claims the benefit of U.S. Ser. No. 61/585,235, filed on Jan. 10, 2012, incorporated by reference.

FIELD OF THE INVENTION

This invention relates generally to electronic devices and more particularly to the activation of electronic devices.

BACKGROUND OF THE INVENTION

A gesture sensor is a human interface device that enables the detection of physical movement proximate to (but not touching) the device. The detected movement can be used, for example, as an input command for the device or for other purposes. In some applications, the device is programmed to recognize distinct non-contact hand motions, such as left-to-right, right-to-left, up-to-down, down-to-up, and in-and-out hand motions.

Generally speaking, gesture recognition enables humans to interface with devices (sometimes known as "Human Machine Interface" or "HMI") without touching the devices. There are many possible applications for HMI based upon gesture recognition. For example, sensors have found popular use in handheld devices, such as tablet computing devices and smartphones, and other portable devices such as laptops. Gesture sensors are also being implemented in video game consoles to detect the motion of a video game player.

Most conventional gesture sensor implementations use three or more illumination sources, such as light emitting diodes (LEDs), and a light sensor, such as a photodetector. Typically, the illumination sources are turned on and off, or flashed, in succession in order for the sensor to obtain spatial information from reflection of the flashed light.

FIG. 1 illustrates a simplified block diagram of a conventional gesture sensor apparatus. A photosensor 4 is positioned proximate light emitting diodes LED 1, LED 2, and LED 3. A control circuit 5 is programmed to successively turn on and off the LEDs 1-3 and to analyze the resulting measurements sensed by the photosensor 4.

FIG. 2 illustrates an example method for detecting a moving target using the gesture sensor apparatus of FIG. 1. The motion is detected by observing the relative delay between sensed signals from the same-axis LEDs. For example, to detect left-to-right or right-to-left motion, the signals sensed by the LEDs 1 and 2 are compared. LED 1 is flashed at a different time than LED 2. That is, the LEDs 1 and 2 are positioned in known locations and are turned on and off in a known sequence. When the light from the LEDs strikes a target moving above the LEDs, light is reflected off the moving target back to the photosensor 4. The sensed reflected light is converted to a voltage signal which is sent to the control circuit 5. The control circuit 5 includes an algorithm that uses the LED positions, the LED firing sequences, and the received sensed data to determine relative movement of the target.

FIG. 2 shows, on the bottom left, the sensed voltage signals for the case of left-to-right motion. A sensed voltage signal is a voltage versus time curve. The curve labeled "Signal from LED 1" shows the sensed voltage resulting from repeated flashes of the LED 1. The low portion of the curve indicates the target is not passing over, or near, the LED 1. In other words, the target is not within the "field of view" of the photosensor 4 whereby light emitted from the LED 1 can be reflected off the target and onto the photosensor 4. If the target is not within the field of view of the photosensor 4 as related to the LED 1, the photosensor 4 does not sense any reflections of light emitted from LED 1. The high portion of the curve indicates the target is passing over, or near, the LED 1. The curve labeled "Signal from LED 2" shows the sensed voltage resulting from repeated flashes of the LED 2. While LED 1 is on, LED 2 is off, and vice versa. While the target is positioned over, or near, LED 1, the sensed voltage related to flashing of LED 1 is high, but the sensed voltage related to flashing of the LED 2 is low. While the target is positioned in the middle, between the two LEDs 1 and 2, the photosensor 4 detects reflected light from flashing of both LED 1 and LED 2. While the target is positioned over, or near, LED 2, the sensed voltage related to flashing of LED 2 is high, but the sensed voltage related to flashing of the LED 1 is low. When the target is not positioned over either LED 1 or LED 2 or between LED 1 and LED 2, the photosensor 4 does not sense reflected light associated with either and the corresponding sensed voltage levels are low.

It will therefore be appreciated that for left-to-right motion, the sensed voltage level for "signal from LED 1" goes high before the sensed voltage level for "signal from LED 2", as shown in FIG. 2. In other words, the voltage versus time curve of "signal from LED 2" is delayed relative to the voltage versus time curve of "signal from LED 1" when the target is moving from left-to-right. For right-to-left motion, as illustrated on the bottom right portion of FIG. 2, the sensed voltage level for "signal from LED 2" goes high before the sensed voltage level for "signal from LED 1", as shown in the two voltage versus time curves on the left hand side of FIG. 2. In other words, the voltage versus time curve of "signal from LED 1" is delayed relative to the voltage versus time curve of "signal from LED 2" when the target is moving from right-to-left.

Other motions can also be sensed with the apparatus of FIG. 1. For example, up and down motion, where up and down is considered to be motion in the y-axis, can be determined using LEDs 2 and 3 and the corresponding voltage versus time data. The control circuit 5 receives the sensed voltage from the photosensor 4 and determines relative target motion in the y-axis in a similar manner as that described above in relation to the x-axis.

A number of portable devices can benefit from the inclusion of a gesture-based HMI. There are, for example, instances where it is inconvenient, impractical or even illegal to handle a cellular telephone (a/k/a "cell phone", "mobile phone", "smartphone", etc.) such that a gesture-based HMI would be very useful. For example, in some states it is not legal to hold a cell phone while driving. The same may apply to other portable devices with display screens, such as tablet computers, GPS units and laptop computers. Collectively, these devices will be referred to as "portable digital devices."

Portable digital devices are almost universally battery powered. Since it is typically the goal to extend battery life in such devices, various battery-saving techniques are often used. For example, portable digital devices with display screens (e.g. smartphones, tablets, GPS units, laptops, etc.) can be put into sleep modes (where the display screen is typically turned off) or other a low-power states by turning off the display screens after a period of inactivity to save power and extend battery life.

Also, portable digital devices are prone to theft due to their small size and high value. For that reason, many portable digital devices have an "auto-lock" feature whereby a password or the like is required to unlock the device for use. For example, a user may be required to enter a multi-digit passcode on a touch-screen display to unlock the device.

Portable digital devices need to be awakened and/or unlocked (generically referred to herein as "activated") when a user wishes to interact with them again. For example, with a smartphone this is typically accomplished by pressing a button, then sliding a slider bar to the right or left, and/or entering a code. All of these actions require physical contact with the smartphone, and can be inconvenient and/or dangerous tasks to be performed while, for example, driving a vehicle.

These and other limitations of the prior art will become apparent to those of skill in the art upon a reading of the following descriptions and a study of the several figures of the drawing.

SUMMARY OF THE INVENTION

Various examples are set forth herein for the purpose of illustrating various combinations of elements and acts within the scope of the disclosures of the specification and drawings. As will be apparent to those of skill in the art, other combinations of elements and acts, and variations thereof, are also supported herein.

An electronic device with gesture activation includes a body having at least one infrared (IR) transmissive window, an IR gesture detection sensor aligned with the transmissive window, a processor coupled to the gesture detection sensor and digital memory coupled to the processor. The digital memory includes code segments executable on the processor for starting a timer if a first gesture of an activation gesture sequence including an ordered plurality of gestures is received while at least one process of the electronic device is in an inactive mode, and for activating the at least one process of the electronic device if the remainder of ordered plurality of gestures is received before the timer has elapsed.

A method for activating an electronic device with gestures includes starting a timer if a first gesture of an activation gesture sequence including an ordered plurality of gestures is received while at least one process of an electronic device is in an inactive mode, and activating the at least one process of the electronic device if the remainder of an ordered plurality of gestures is received before the timer has elapsed. The inactive mode can be, for example, a sleep mode and/or a locked mode of a portable digital device such as a cell phone, smart phone, satellite phone, GPS unit, tablet computer or laptop computer.

An advantage of certain embodiments is that one or more inactivated modes of an electronic device can be activated without touching the device. This feature is particular advantageous with respect to portable digital devices which should be used in a "hands free" mode while operating a motorized vehicle or under other hazardous conditions.

These and other examples of combinations of elements and acts supported herein as well as advantages thereof will become apparent to those of skill in the art upon a reading of the following descriptions and a study of the several figures of the drawing.

BRIEF DESCRIPTION OF DRAWINGS

Several examples will now be described with reference to the drawings, wherein like elements and/or acts are provided with like reference numerals. The examples are intended to illustrate, not limit, concepts disclosed herein. The drawings include the following figures:

FIG. 7 is a pseudocode listing of a process for gesture recognition as may be implemented by a digital processor of a human interface device.

DETAILED DESCRIPTION OF THE INVENTION

Figure 1:
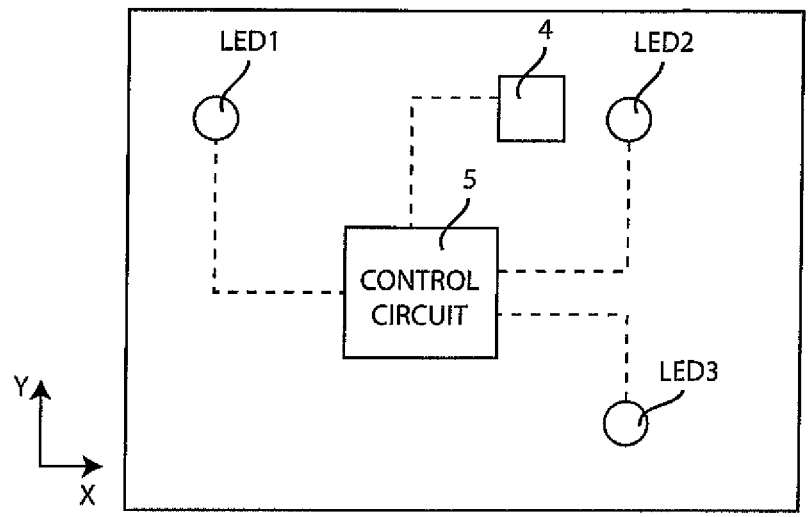
FIG. 1 is a simplified block diagram of a conventional gesture sensor apparatus.
Figure 2:
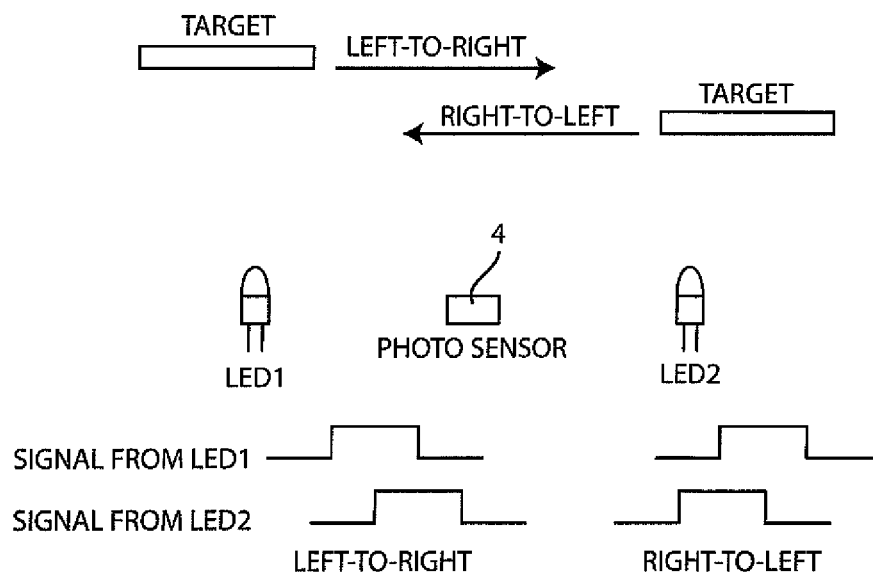
FIG. 2 illustrates an example method for detecting a moving target using the gesture sensor apparatus of FIG. 1.
Figure 3:
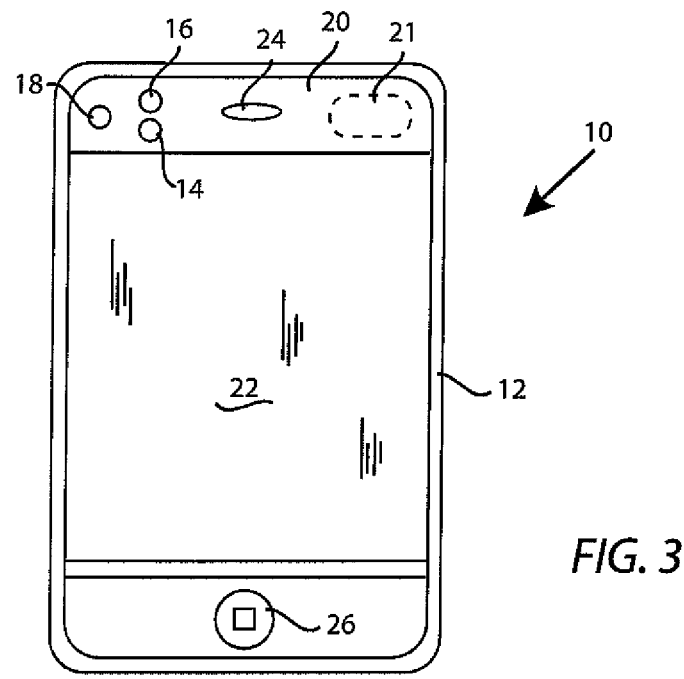
FIG. 3 is a top plan view of an example smartphone with a gesture recognition sensor.

FIGS. 1 and 2 were described with respect to the prior art. FIG. 3 illustrates, by way of example and not limitation, a gesture recognition system with optional heart rate monitor system built into a smartphone 10. In this example, the smartphone 10 includes a body 12, an LED 14, a photodetector 16, a light sensor 18, a transmissive surface 20 (e.g. a glass or plastic surface) providing a window for an aligned gesture detection sensor 21. The example smartphone 10 further includes a touch-screen area 22 including a display screen, a speaker aperture 24, and a control button 26.

The light emitting diode (LED) 14 is a preferred example of a light emitting source, although other light emitting sources may also be suitable in some applications. In an example embodiment, the LED 14 is an I/R LED such that the light that it emits is generally not detectible by the human eye and the transmissive surface 20 is transparent, or at least translucent to IR light. The photodetector 16 can be, for example, a photodiode, although other photodetectors may also be suitable for some applications.

In an embodiment, set forth by way of example and not limitation, LED 14 and photodetector 16 are aligned proximate to the transmissive surface 20 (which may be substantially planar). In this way, if a finger is place on the transmissive surface 20 over the LED 14 and the photodetector 16, I/R light from the LED 14 may reflect off of the finger to the photodetector 16 for the monitoring of heart rate. In other embodiments, the heart rate monitor system (including, for example, LED 14 and photodetector 16 may be omitted, or the LED 14 and photodetector 16 may be used for other purposes.

Gesture detection sensor 21, in this example embodiment, is positioned proximate to transmissive surface 20 for sensing hand gestures. As will be discussed in greater detail subsequently, these gestures can include a predetermined number and types of hand movements within the field of view of the gesture detection sensor 21. It should be noted that actual physical contact with the smartphone 10 is not required such that certain functionality of the smartphone 10 or devices in communication with the smartphone 10 can be affected without having to physically contact the smartphone 10.

The structures and uses of suitable gesture detection sensors, such as gesture detection sensor 21, are disclosed in U.S. Ser. No. 61/483,034, filed May 5, 2011 and in U.S. Ser. No. 13/304,603, filed Nov. 25, 2011, both of which are incorporated by reference in their entirety. Preferably, the gesture detection sensor 21 is responsive to I/R light, of the type generated by I/R LED 14. The use of I/R gesture detection sensors can be advantageous in that a visible light source is not required to detect hand gestures. Other gesture detection sensors are also suitable as will be appreciated by those of ordinary skill in the art.

Figure 4:
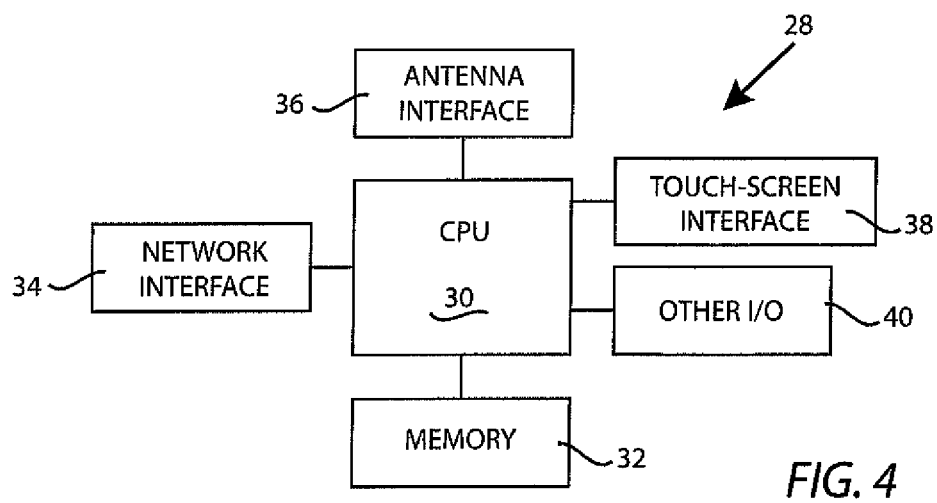
FIG. 4 is a block diagram of example CPU and related circuitry of the example smartphone of FIG. 1.

FIG. 4 is a block diagram, set forth by way of example and not limitation, of circuitry 28 within the body 12 of smartphone 10. The circuitry includes a CPU 30, memory 32, a network interface 34, an antenna interface 36, a touch-screen interface 38 and other input/output (I/O) circuitry 40. The other I/O circuitry 40 can include, for example, an interface to a gesture detection apparatus, such as gesture detection sensor 21. The antenna interface 36 provides radio frequency connectivity with external devices and/or networks. For example, the smartphone 10 can wirelessly communicate with the cellular network, with the Internet (typically via a WiFi connection) or with other devices via Bluetooth.

The CPU 30 can be provided by several manufacturing sources, as will be appreciated by those of skill in the art, and the memory 32 can include both volatile and non-volatile digital memory (a/k/a "computer readable media"), both of which are capable of storing data and program code in a non-transient fashion (i.e. not as a propagating electromagnetic waves). The CPU is alternatively referred to herein as a microprocessor, microcontroller, or simply processor, and is capable of executing instructions stored as code segments in memory 32 or forms of non-transient computer readable media, as will be appreciated by those of ordinary skill in the art.

A number of processes for gesture recognition will now be described. While these processes are described with respect to the activation of electronic devices, and more particularly portable digital devices with screens, it will be appreciated by those of skill in the art that the processes have additional applications in human-machine interfaces. In the context of example portable digital devices, "activation" will mean unlocking and/or waking up part or all of the functionality of the devices. In the context of other electronic devices, the gesture recognition processes can be used for alternate purposes.

Figure 5:
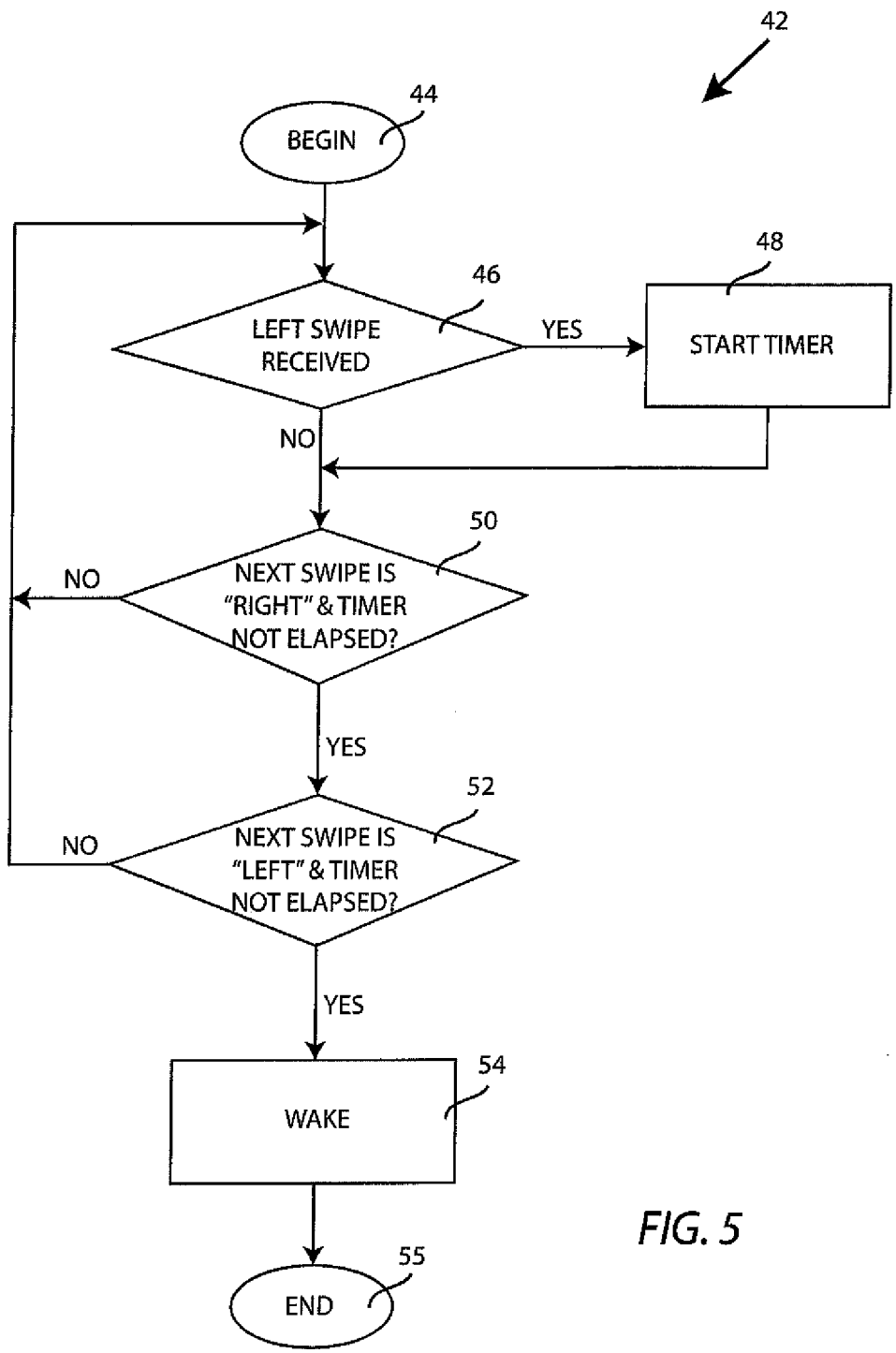
FIG. 5 is a flow diagram, set forth by way of example and not limitation, of a process for gesture recognition which can be implemented by an electronic device.

FIG. 5 is a flow diagram of an example process 42 for gesture recognition. Process 42 begins at 44, and an operation 46 determines if a "left swipe" is received. If so, a timer is started in operation 48. Then, an operation 50 determines if a "right swipe" has been received and the timer has not elapsed. If so, an operation 52 determines if a "left swipe" is received and the timer has not elapsed. If so, a command 54 can be given to the portable digital device (e.g. smartphone), such as "wake" to wake it up, for example, from a sleep state, and the example process 42 ends at 55.

Figure 6:
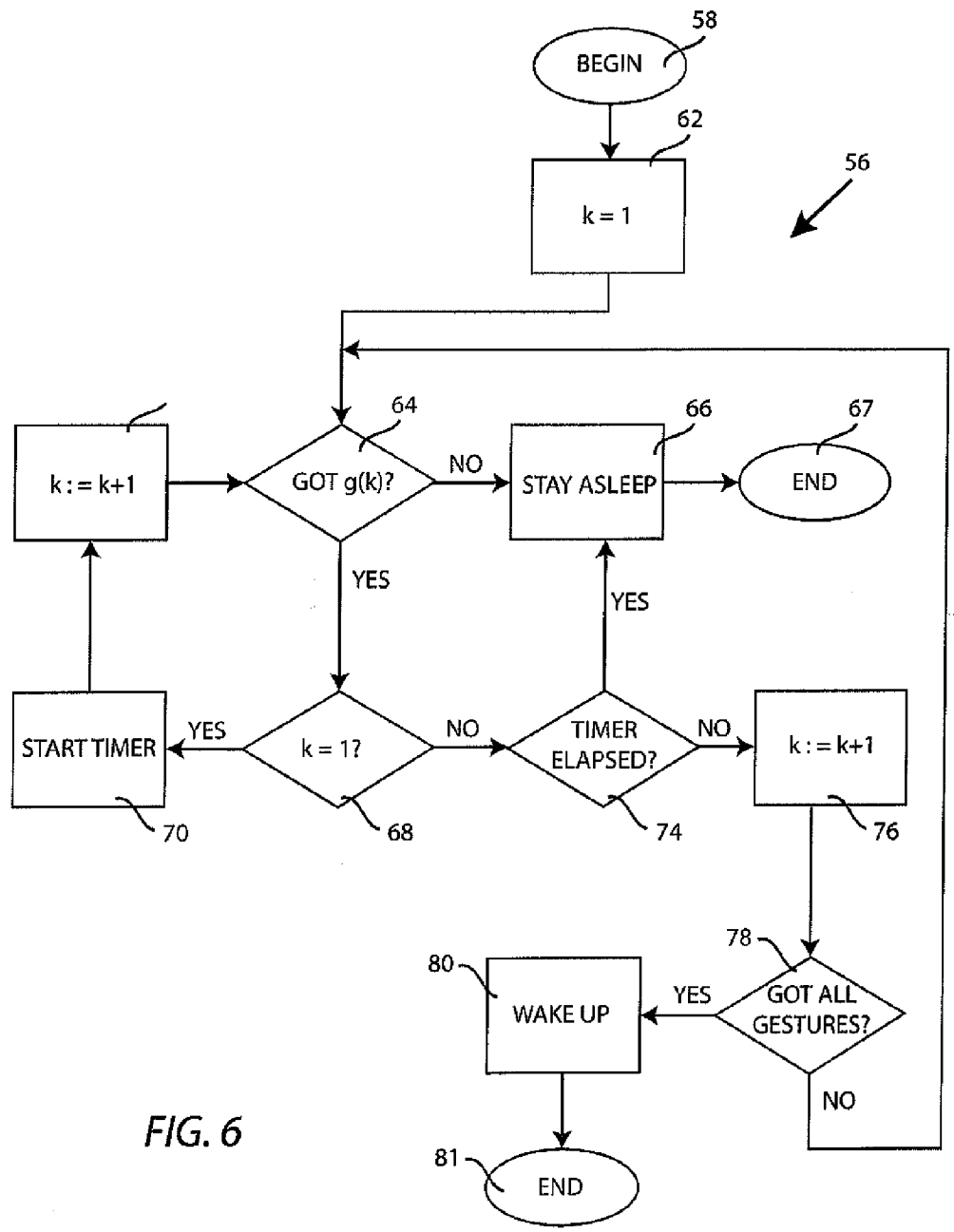
FIG. 6 is a flow diagram, set forth by way of example and not limitation, of a more generalized process for gesture recognition.

FIG. 6 is a flow diagram of an example process 56 for gesture recognition which begins at 58 in an inactive state or mode (e.g. asleep and/or locked). A counter k is initialized at operation 62 and it is determined if the $k^{th}$ gesture g(k) is received at operation 64. If so, an operation 68 determines if the counter k is equal to one. If so, a timer is started by operation 70 to provide a "timeout period" or "timeout window" within which all gestures must be received in order to create an activation command. Next, operation 72 increments k and process control returns to operation 64. If, however, operation 68 determines that k is not equal to 1, an operation 74 determines if the timer has elapsed (i.e. if the process has exceeded the timeout period or window). If not, the counter k is incremented by operation 76 and it is determined if all of the gestures have been received in an operation 78. If so, the device is issued a command, such as "wake up", in an operation 80, and the process 56 ends at 81. If operation 78 determines that not all of the gestures have been received, process control is returned to operation 64. If operation 64 determines that gesture g(k) has not been received or if operation 74 determines that there is a timeout because the timer has elapsed, the device is commanded to stay asleep at operation 66 and the process ends at 67.

A generalized expression of an example gesture recognition process is as follows. Let the $k^{th}$ gesture in a sequence, or tuple, be denoted by $g_k$. A n-tuple of arbitrary length would be written as $S_{unlock}=(g_1, g_2, g_3, \ldots, g_n)$. Clearly, $S_{unlock}$ must be of finite length, and each gesture $g_k$ is preferably be well-defined. Preferably, there is also be a timeout window length, $T_{detect}$. For there to be an unlock action, the sequence $S_{unlock}$ should be received within the window $T_{detect}$ to result in an activation command for the device.

It should be noted that the expression of a gesture recognition sequence as an n-tuple is very flexible. For example, a gesture can be defined as a series of simpler gestures detected within a certain period of time. Also, the gesture recognition sequence can be easily changed or customized for a user who may have certain preferences or who wishes to have the additional security of, for example, a custom unlock sequence. The n-tuple gesture recognition sequence therefore allows for great flexibility, customization and security of an electronic device.

FIG. 7 illustrates, using pseudocode, an example computer-implemented process 82 for gesture recognition. The process 82 can be implemented, for example, on CPU 30 using an application program, "app", utility, routine, etc. stored as code segments in non-transitory computer readable media such as memory 32, as will be appreciated by those of skill in the art. This example process will be described in the context of unlocking a locked electronic device, it being understood that it is also applicable to unlocking a feature, waking a "sleeping" device, activating part or all of a devices functionality, etc.

In the example of FIG. 7, it is assumed, as a precondition, that the device is in a locked mode and a first gesture in a sequence is detected or "received." The postcondition of process 82, in this example, is that the device is either unlocked or remains locked. The process 82 is implemented as a routine detect_unlock with parameters key_sequence, received_gesture and window_length. If detect_unlock detects an unlock sequence the routine will return an indication of "success." If detect_unlock does not timely detect an unlock sequence the routine will return an indication of "fail." Key_sequence is the sequence of movements which correspond to an unlock sequence, received_gesture is the most recently received gesture, and window_length is a timeout parameter (e.g. as measured in seconds and/or fractions of a second). If the first received gesture (received_gesture) is not equal to the first gesture of the unlock sequence (key_sequence[0]), then the device is not unlocked and a the process returns a "fail." If, however, the first received gesture is the first gesture of an unlock sequence, a counter "k" is initialized to 1 and a time t0 is initialized to the current time.

Next, a do-loop is entered which will continue until the first of a timeout (current_time( )>t0+window-length) or until an unlock sequence is completed. Current_time( ) in this example is a routine that returns the current time, e.g. from a real-time clock, timer, etc. In the do-loop, a gesture is obtained by calling a routine get_a_gesture( ). The current gesture is then compared to the next gesture of the gesture sequence (e.g. key_sequence[k]) and, if they are not the same, the device is not unlocked and the process returns a "fail." If the gesture is the next gesture in the sequence, the counter k is incremented, and the do-loop continues. If the do-loop terminates because of either a timeout or an unlock sequence is completed, a second if statement determines whether it is the former or the latter. That is, if the unlock sequence had been completed ("all gestures received") the routine will unlock the device and return a "success." Otherwise, the do-loop had timed out, and the device is not unlocked and the routine returns a "fail."

Although various examples have been described using specific terms, processes and devices, such description is for illustrative purposes only. The words used are words of description rather than of limitation. Also, as noted above, process for recognizing gestures can be used in conjunction with a number of different types of devices and machines and is not limited to the examples set forth above. It is to be understood that changes and variations may be made by those of ordinary skill in the art without departing from the spirit or the scope of any examples described herein. In addition, it should be understood that aspects of various other examples may be interchanged either in whole or in part. It is therefore intended that the claims herein and hereafter presented be interpreted in accordance with their true spirit and scope and without limitation or estoppel.

What is claimed is:

1. An electronic device with gesture activation comprising:
    a body including at least one infrared (IR) transmissive window;
    an IR gesture detection sensor located within the body and aligned with the transmissive window;
    a processor located within the body and coupled to the gesture detection sensor; and
    digital memory disposed within the body and coupled to the processor where the memory includes codes segments executable on the processor for:
    (a) starting a timer if a first gesture of an activation gesture sequence including an ordered plurality of gestures is detected by said IR gesture detection sensor while at least one process of the electronic device is in an inactive mode; and
    (b) activating the at least one process of the electronic device if the remainder of ordered plurality of gestures is received before the timer has elapsed;
    wherein the electronic device is a portable digital device provided with a display screen and a wireless connection to at least one of a cellular telephone network and the Internet.

2. An electronic device with gesture activation as recited in claim 1 wherein the inactive mode is a sleep mode.

3. An electronic device with gesture activation as recited in claim 1 wherein the inactive mode is a locked mode.

4. An electronic device with gesture activation as recited in claim 1 wherein the inactive mode is one of a plurality of operational modes of the electronic device.

5. An electronic device with gesture activation as recited in claim 1 wherein the inactive mode is one of a plurality of operational modes of the electronic device.

6. An electronic device with gesture activation as recited in claim 1 wherein an activation gesture sequence $S_{unlock}$ is a tuple of arbitrary length n written as $S_{unlock}=(g_1, g_2, g_3, \ldots, g_n)$ where the $K^{th}$ gesture in the n-tuple is denoted by $g_k$.

7. An electronic device with gesture activation as recited in claim 6 wherein the timer is set to a window length $T_{detect}$ such that the activation gesture sequence $S_{unlock}$ must occur within the window length $T_{detect}$.

8. An electronic device with gesture activation as recited in claim 1 wherein the body further includes a light emitting source which generates an IR light to which the IR gesture detection sensor is responsive.

9. An electronic device with gesture activation as recited in claim 8 wherein the body further includes a photodetector, whereby the light emitting source and the photodetector are positioned with respect to the body such that they can be used for the monitoring of heart rate.

10. An electronic device as recited in claim 9 wherein the light emitting source comprises an LED and the photodetector comprises a photodiode.

11. A method for activating an electronic device with gestures comprising:
    detecting hand gestures using an IR gesture detection sensor;
    starting a timer if a first gesture of an activation gesture sequence including an ordered plurality of gestures is detected by said gesture detection sensor while at least one process of an electronic device is in an inactive mode; and
    activating the at least one process of the electronic device if the remainder of an ordered plurality of gestures is received before the timer has elapsed;
    wherein the electronic device is a portable digital device including a display screen and wireless connection to a network.

12. A method for activating an electronic device with gestures as recited in claim 11 wherein the inactive mode is a locked mode.

13. A method for activating an electronic device with gestures as recited in claim 12 wherein the inactive mode is one of a plurality of operational modes of the electronic device.

14. A method for activating an electronic device with gestures as recited in claim 11 wherein the gestures include left swipe and right swipe.

15. A method for activating an electronic device with gestures as recited in claim 11 further comprising illuminating the hand gestures with an IR light emitting source.

* * * * *